United States Patent
Mandelbaum et al.

(10) Patent No.: US 11,584,280 B2
(45) Date of Patent: Feb. 21, 2023

(54) SEATING ASSEMBLY FOR A VEHICLE

(71) Applicant: Ford Global Technologies, LLC, Dearborn, MI (US)

(72) Inventors: Dylan Mandelbaum, Mountain View, CA (US); Michael Steven Medoro, Sunnyvale, CA (US); Andres Almeida Senatore, San Jose, CA (US); Siddharthan Selvasekar, Livermore, CA (US); Jimmy Moua, Canton, MI (US); Katherine Ann Arnold, Taylor, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 17/307,025

(22) Filed: May 4, 2021

(65) Prior Publication Data
US 2022/0355717 A1    Nov. 10, 2022

(51) Int. Cl.
*B60N 2/90*    (2018.01)
*F03G 7/06*    (2006.01)
*B60N 2/02*    (2006.01)

(52) U.S. Cl.
CPC .......... *B60N 2/995* (2018.02); *B60N 2/0224* (2013.01); *F03G 7/065* (2013.01); *F05C 2251/08* (2013.01)

(58) Field of Classification Search
CPC ....... B60N 2/995; B60N 2/0224; F05G 7/065; F05C 2251/08
See application file for complete search history.

(56) References Cited

U.S. PATENT DOCUMENTS

| | | | |
|---|---|---|---|
| 5,176,424 A | 1/1993 | Tobita et al. | |
| 7,758,121 B2 | 7/2010 | Browne et al. | |
| 2004/0245841 A1 | 12/2004 | Peterson et al. | |
| 2005/0218710 A1 | 10/2005 | Browne et al. | |
| 2007/0084220 A1 | 4/2007 | Asada et al. | |
| 2017/0112288 A1 | 4/2017 | DuFresne | |

FOREIGN PATENT DOCUMENTS

JP    2000262578 A    9/2000

*Primary Examiner* — Philip F Gabler
(74) *Attorney, Agent, or Firm* — Vichit Chea; Price Heneveld LLP

(57) ABSTRACT

A seating assembly comprises a calf rest coupled to a seat base and having a body that comprises a first trough that extends from a first exterior peak to an interior peak and a second trough that extends from a second exterior peak to the interior peak. The seating assembly also comprises a wire that extends across the first trough from the first exterior peak to the interior peak, the wire being operable between an at rest condition and a contracted condition, wherein movement of the wire from the at rest condition to the contracted condition moves a portion of the wire between the first exterior peak and the interior peak away from a bottom of the first trough. The seating assembly further comprises a controller that prompts electrical current to be supplied to the wire to move the wire from the at rest condition to the contracted condition.

16 Claims, 6 Drawing Sheets

SEATING ASSEMBLY FOR A VEHICLE

FIELD OF THE DISCLOSURE

The present disclosure is generally directed to a seating assembly for a vehicle and, more particularly, to a seating assembly that includes a calf rest and a wire coupled to the calf rest.

BACKGROUND OF THE DISCLOSURE

Vehicles have seats. Massaging features for vehicle seats may be desired.

SUMMARY OF THE DISCLOSURE

According to a first aspect of the present disclosure, a seating assembly includes a seat base, a seatback coupled to the seat base, and a calf rest coupled to the seat base and having a body that includes a first trough that extends from a first exterior peak to an interior peak, and a second trough that extends from a second exterior peak to the interior peak. The seating assembly also includes a wire that extends across the first trough from the first exterior peak to the interior peak. The wire is operable between an at rest condition and a contracted condition. Movement of the wire from the at rest condition to the contracted condition moves a portion of the wire between the first exterior peak and the interior peak away from a bottom of the first trough. Further, the seating assembly includes a controller that prompts electrical current to be supplied to the wire to move the wire from the at rest condition to the contracted condition.

Embodiments of the first aspect of the present disclosure can include any one or a combination of the following features:
- the wire further extends across the second trough from the interior peak to the second exterior peak;
- a height of the interior peak relative to the bottom of the first trough is greater than a height of the first exterior peak relative to the bottom of the first trough;
- the calf rest extends from a proximal end that is proximate to the seat base to a distal end that is distal from the seat base, and, relative to the interior peak, the bottom of the first trough is shallowest proximate to the distal end of the calf rest;
- the wire extends along the contour of the first trough between the first exterior peak and the interior peak in the at rest condition, and is suspended from the first exterior peak and the interior peak over the first trough in the contracted condition;
- the body is a foam body that is shaped to form the first and second troughs, the interior peak, and the first and second exterior peaks;
- the foam body is expanded polypropylene;
- the first trough of the foam body includes a contoured section having a curved surface that is between the first exterior peak and the interior peak and a sloped section having a generally planar surface that is between the contoured section and the interior peak; and
- the sloped section slopes foam body-laterally-inboard away from the contoured section and toward the interior peak.

According to a second aspect of the present disclosure, a seating assembly for a vehicle includes a seat base, a seatback coupled to the seat base, and a calf rest coupled to the seat base and having a body that includes a first trough that extends from a first exterior peak to an interior peak and a second trough that extends from a second exterior peak to the interior peak. The calf rest is operable to move relative to the seat base between a retracted position and a deployed position. The seating assembly also includes a wire that extends across the first trough from the first exterior peak to the interior peak and across the second trough from the interior peak to the second exterior peak. The wire is operable between an at rest condition and a contracted condition. In the at rest condition. the wire extends along a contour of the first trough between the first exterior peak and the interior peak and along a contour of the second trough from the interior peak to the second exterior peak. In the contracted condition, the wire is suspended from the first exterior peak and the interior peak over the first trough and is suspended from the interior peak and the second exterior peak over the second trough. Further, the seating assembly includes a controller that prompts electrical current to be supplied to the wire to move the wire from the at rest condition to the contracted condition.

Embodiments of the second aspect of the present disclosure can include any one or a combination of the following features:
- a height of the interior peak relative to a bottom of the first trough is greater than a height of the first exterior peak relative to the bottom of the first trough;
- the calf rest extends from a proximal end that is proximate to the seat base in the deployed position of the calf rest to a distal end that is distal from the seat base in the deployed position of the calf rest, and, relative to the interior peak, the bottom of the first trough is shallowest proximate to the distal end of the calf rest;
- the body is a foam body that is shaped to form the first and second troughs, the interior peak, and the first and second exterior peaks;
- the foam body is expanded polypropylene;
- the first trough of the foam body includes a contoured section having a curved surface that is between the first exterior peak and the interior peak and a sloped section having a generally planar surface that is between the contoured section and the interior peak; and
- the sloped section slopes foam body-laterally-inboard away from the contoured section and toward the interior peak.

According to a third aspect of the present disclosure, a body for a calf rest of a seating assembly includes first and second exterior peaks in a spaced relationship with each other, an interior peak between the first and second exterior peaks, a first trough that extends between the first exterior peak and the interior peak, and a second trough that extends between a second exterior peak and the interior peak. The first trough includes a contoured section having a curved surface that is disposed between the first exterior peak and the interior peak and a sloped section having a generally planar surface that is disposed between the contoured section and the interior peak. The second trough includes a contoured section having a curved surface that is disposed between the second exterior peak and the interior peak and a sloped section having a generally planar surface that is disposed between the contoured section of the second trough and the interior peak.

Embodiments of the third aspect of the present disclosure can include any one or a combination of the following features:
- a plane of the surface of the sloped section of the first trough is not parallel to a plane of the surface of the sloped section of the second trough;

the plane of the surface of the sloped section of the first trough and the plane of the surface of the sloped section of the second trough intersect to form an angle that is between about 30 degrees and about 90 degrees; and the first and second exterior peaks are formed of expanded polypropylene.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
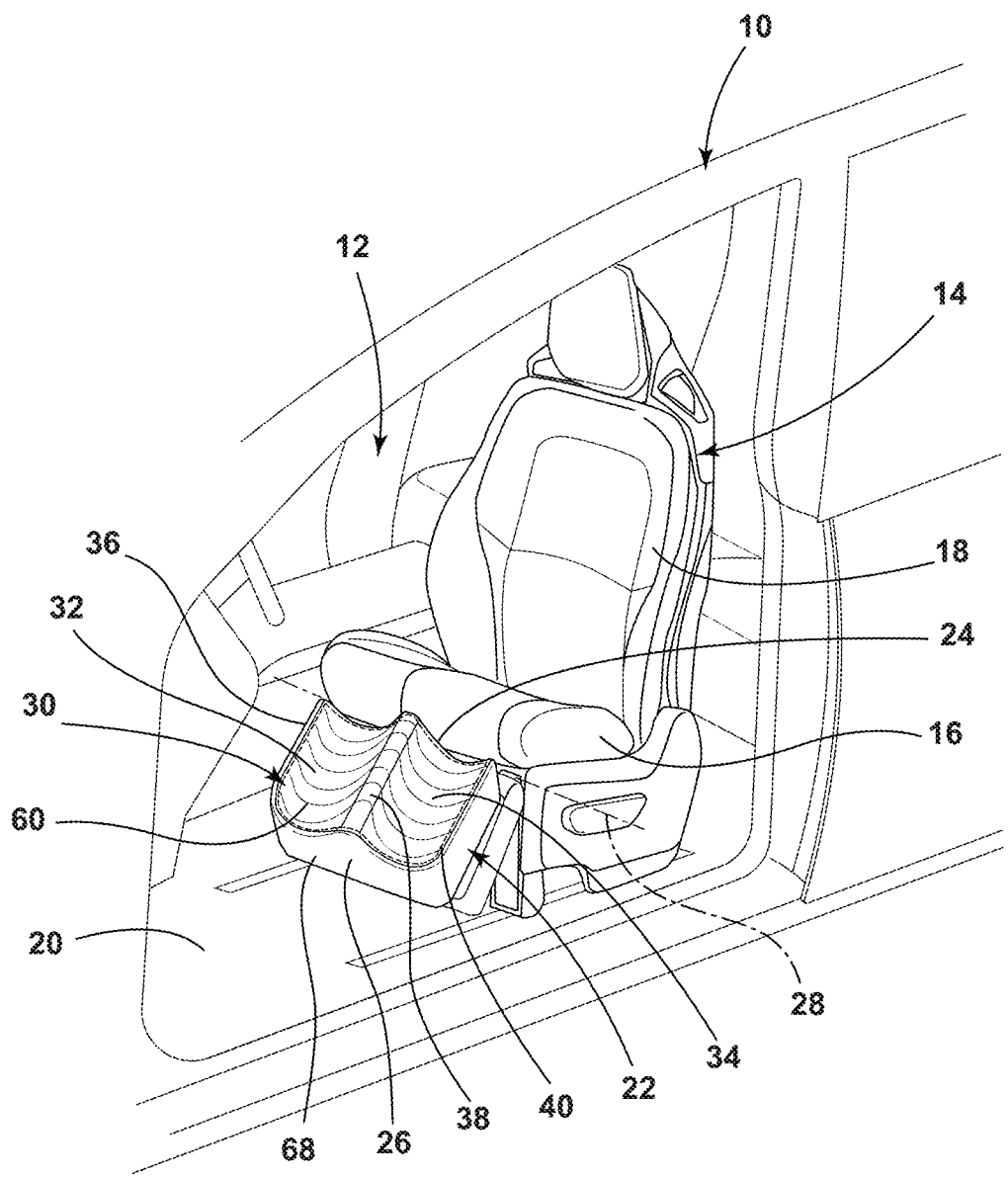
FIG. 1 is a perspective view of a seating assembly disposed within a vehicle interior of a vehicle, illustrating a calf rest of the seating assembly in a deployed position, according to one embodiment.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-7, a seating assembly 14 includes a seat base 16. A seatback 18 is coupled to the seat base 16. A calf rest 22 is coupled to the seat base 16 and is operable to move relative to the seat base 16 between a retracted position and a deployed position. The calf rest 22 includes a body 30. The body 30 includes a first trough 32 that extends from a first exterior peak 36 to an interior peak 38 and a second trough 34 that extends from a second exterior peak 40 to the interior peak 38. A wire 60 extends across the first trough 32 from the first exterior peak 36 to the interior peak 38 and across the second trough 34 from the interior peak 38 to the second exterior peak 40. The wire 60 is operable between an at rest condition and a contracted condition. In the at rest condition, the wire 60 extends along a contour of the first trough 32 between the first exterior peak 36 and the interior peak 38 and along the contour of the second trough 34 from the interior peak 38 to the second exterior peak 40. In the contracted condition, the wire 60 is suspended from the first exterior peak 36 and the interior peak 38 over the first trough 32 and is suspended from the interior peak 38 and the second exterior peak 40 over the second trough 34. A controller 64 prompts electrical current to be supplied to the wire 60 to move the wire 60 from the at rest condition to the contracted condition.

Figure 2:
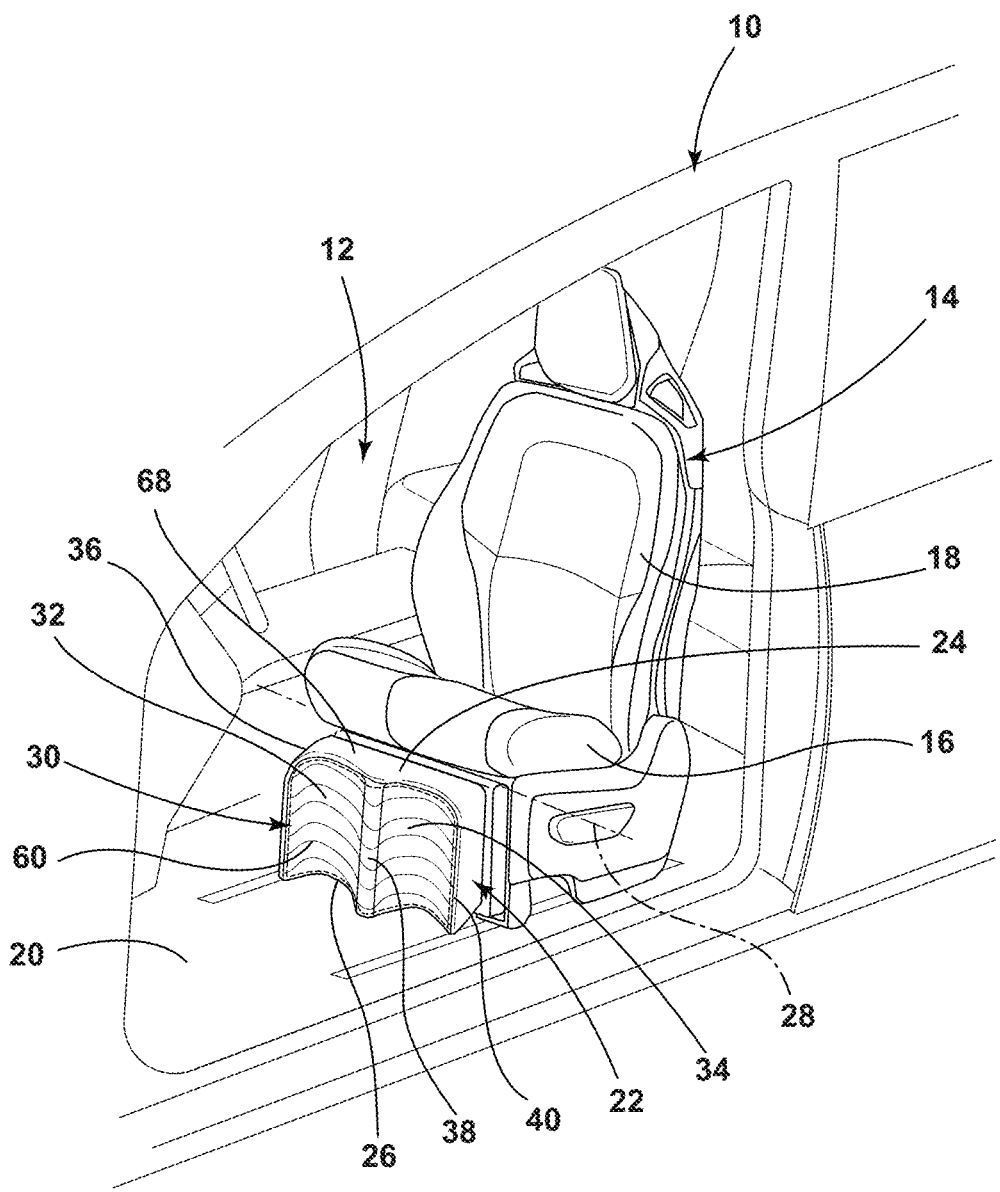
FIG. 2 is a perspective view of the seating assembly disposed within the vehicle interior of the vehicle, illustrating the calf rest of the seating assembly in a retracted position, according to one embodiment.

Referring now to FIGS. 1 and 2, a vehicle 10 includes a vehicle interior 12. The vehicle interior 12 may include the seating assembly 14. The seating assembly 14 includes a seat base 16 and seatback 18 coupled to the seat base 16. In an exemplary embodiment, the seat base 16 is coupled to a floor 20 of the vehicle 10 and the seatback 18 is pivotably coupled to the seat base 16. As illustrated in FIG. 1, the seating assembly 14 may include the calf rest 22. The calf rest 22 may be coupled to the seat base 16 and may extend from a proximal end 24 to a distal end 26. The proximal end 24 may be proximal to the seat base 16 and the distal end 26 may be distal from the seat base 16, in various embodiments.

In some embodiments, the calf rest 22 may be operable between the retracted position and the deployed position. In the embodiment illustrated in FIGS. 1 and 2, the calf rest 22 is pivotably coupled to the seat base 16 and is operable to pivot about a pivot axis 28 that is proximate to the proximal end 24 of the calf rest 22 between the deployed position, as illustrated in FIG. 1, and the retracted position, as illustrated in FIG. 2. The calf rest 22 may pivot generally vehicle-upward from the retracted position to the deployed position, such that the position of the distal end 26 of the calf rest 22 in the retracted position is generally vehicle-downward of the position of the distal end 26 of the calf rest 22 in the deployed position, as illustrated in FIGS. 1 and 2.

Figure 3:
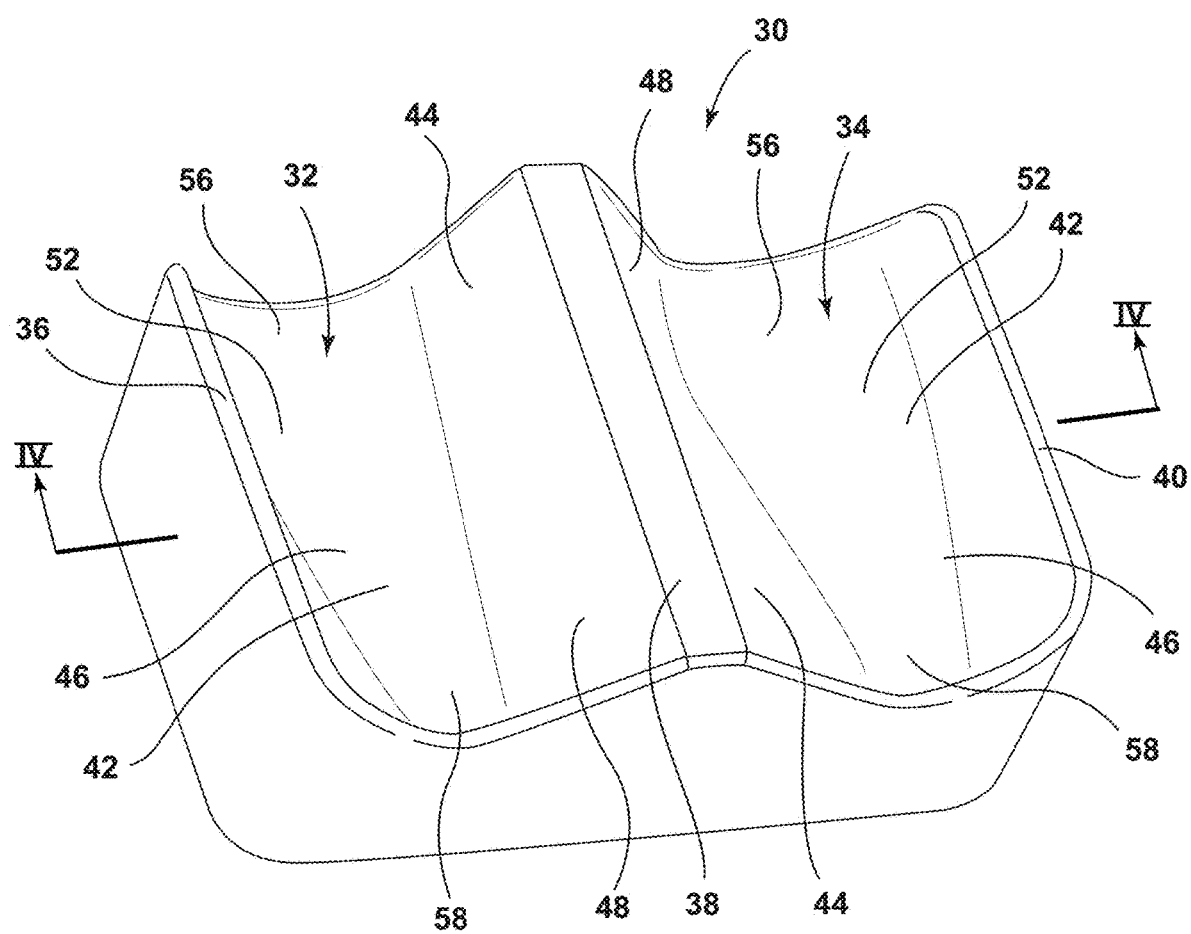
FIG. 3 is an upper perspective view of a body of the calf rest, illustrating first and second troughs, according to one embodiment.

Referring now to FIGS. 1-4, the calf rest 22 may include the body 30. The body 30 may include first and second troughs 32, 34 configured to receive the lower portions of the legs L of an occupant of the seating assembly 14. The first trough 32 may extend laterally from the first exterior peak 36 of the body 30 to the interior peak 38 of the body 30. The second trough 34 may extend laterally from the second exterior peak 40 of the body 30 to the interior peak 38. As illustrated in FIG. 3, the interior peak 38 is positioned between the first and second troughs 32, 34. In various embodiments, the first and second exterior peaks 36, 40 and the interior peak 38 of the body 30 may extend between the proximal and distal ends 24, 26 of the calf rest 22 generally parallel to each other. Further, the first and second troughs 32, 34 may extend between the proximal and distal ends 24, 26 of the calf rest 22 generally parallel to each other.

The body 30 of the calf rest 22 may be made of at least one of a variety of types of materials, in various embodiments. In some embodiments, the body 30 of the calf rest 22 may be a foam body 30. In some implementations, the foam body 30 may be expanded polypropylene foam. In some embodiments, one or more portions of the body 30 may be comprised of foam. For example, the first and second exterior peaks 36, 40, the interior peak 38, and/or the first and second troughs 32, 34 may be formed of expanded polypropylene. Various types of foam are contemplated. The calf rest 22 may include a variety of components in addition to the body 30. For example, a trim cover 68 may generally encapsulate the body 30, as illustrated in FIGS. 1 and 2. As described further herein, the calf rest 22 may further include the wire 60, in various embodiments.

Figure 4:
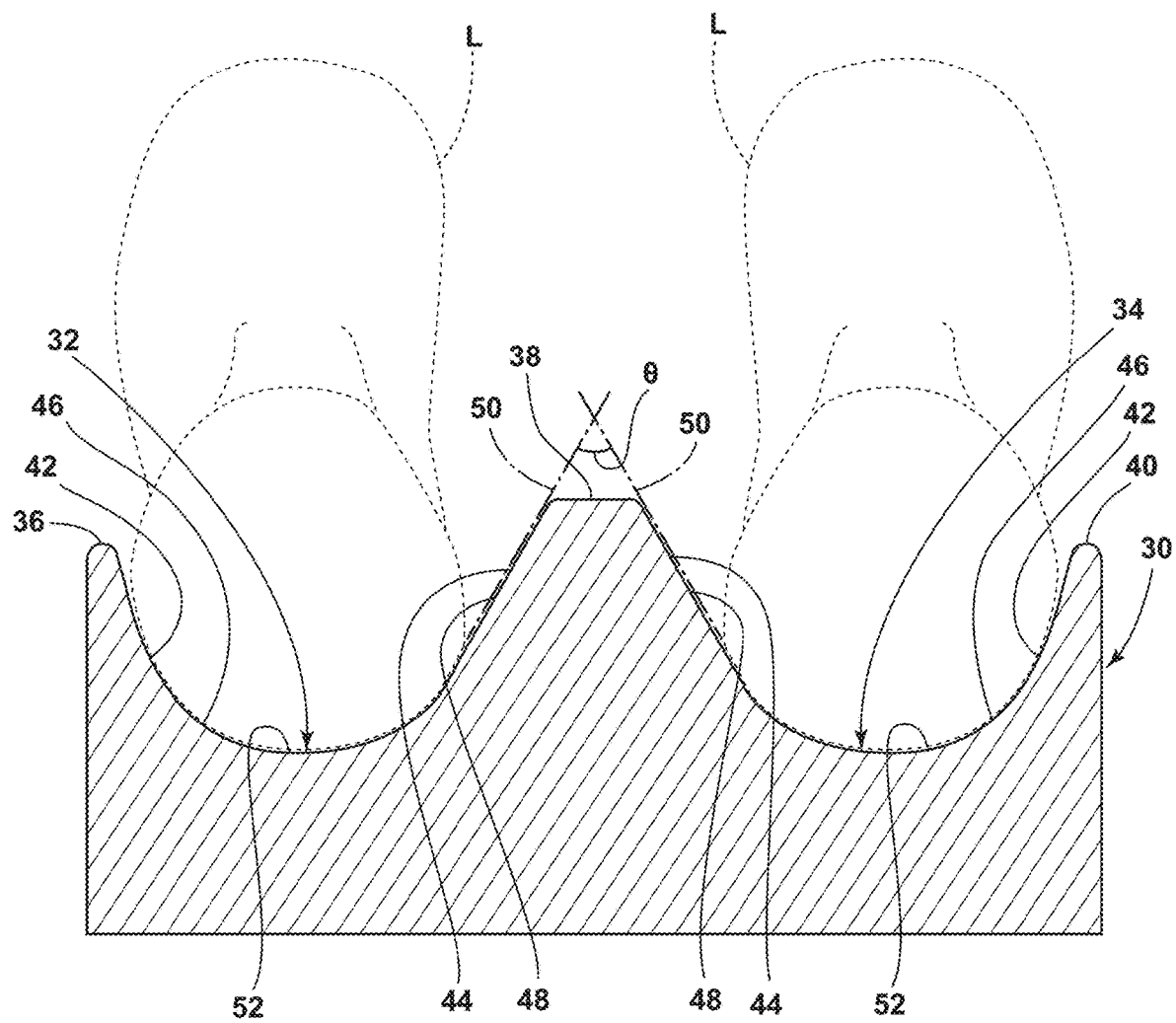
FIG. 4 is a cross-sectional view of the body of FIG. 3 taken through line IV-IV, illustrating legs of a seated occupant in the phantom, according to one embodiment.

Referring now to FIGS. 3 and 4, in some embodiments, the first trough 32 of the body 30 may include a contoured section 42 that is disposed between the first exterior peak 36 and the interior peak 38 of the body 30, and a sloped section 44 that is disposed between the contoured section 42 of the first trough 32 and the interior peak 38 of the body 30. The contoured section 42 of the first trough 32 may include a curved, non-planar surface 46. As illustrated in FIG. 4, the curved surface 46 of the contoured section 42 of the first trough 32 extends from the first exterior peak 36 of the body 30 to the sloped section 44 of the first trough 32, which is adjacent to the contoured section 42. In various embodiments, the surface 46 of the contoured section 42 of the first trough 32 may be curved to generally contour a shape of at least a portion of the lower leg L of an occupant of the seating assembly 14. In some embodiments, the curved surface 46 of the contoured section 42 may be contoured to follow the shape of the rear side of the lower leg L of a 50th percentile male mannequin. Various contours are contemplated.

Referring still to FIGS. 3 and 4, the sloped section 44 of the first trough 32 of the body 30 may have a generally planar surface 48. As illustrated in FIG. 4, the generally planar surface 48 of the sloped section 44 of the first trough 32 extends from the contoured section 42 of the first trough 32 to the interior peak 38 of the body 30. In the embodiment illustrated in FIG. 3, the second trough 34 includes a contoured section 42 and a sloped section 44. The contoured section 42 of the second trough 34 is disposed between the second exterior peak 40 and the interior peak 38, and the sloped section 44 is disposed between the contoured section 42 of the second trough 34 and the interior peak 38 of the body 30. The contoured section 42 of the second trough 34 includes a curved surface 46, and the sloped section 44 of the second trough 34 includes a generally planar surface 48. As described above in reference to the contoured section 42 of the first trough 32, the contoured section 42 of the second trough 34 may be contoured to follow the shape of a portion of the lower leg L of an occupant seated in the seating assembly 14.

Referring still to FIGS. 3 and 4, in various embodiments, the generally planar surfaces 48 of the sloped sections 44 of the first and second troughs 32, 34 may define planes 50 that are not parallel to each other. In various implementations, the plane 50 of the surface 48 of the sloped section 44 of the first trough 32 and the plane 50 of the surface 48 of the sloped section 44 of the second trough 34 may intersect to form an angle $\theta$. In some embodiments, the angle $\theta$ formed may be between about 30° and about 90°. In some embodiments, the angle $\theta$ formed may be between about 45° and about 75°. In some embodiments, the angle $\theta$ formed may be about 60°, as illustrated in FIG. 4. In the embodiment illustrated in FIGS. 3 and 4, the sloped sections 44 of the body 30 slope foam body-laterally-inboard away from the contoured sections 42 toward the interior peak 38 of the body 30.

Referring now to FIGS. 1-4, in various embodiments, a height of the interior peak 38 of the body 30 relative to a bottom 52 of the first trough 32 of the body 30 may be greater than a height of the first exterior peak 36 relative to the bottom 52 of the first trough 32. Further, the height of the interior peak 38 relative to a bottom 52 of the second trough 34 may be greater than the height of the second exterior peak 40 relative to the bottom 52 of the second trough 34. As such, in various embodiments, the interior peak 38 may extend outward further than the first and second exterior peaks 36, 40 of the body 30. In some embodiments, the bottom 52 of the first trough 32 may be shallowest proximate to the distal end 26 of the calf rest 22. Further, the bottom 52 of the second trough 34 may be shallowest relative to the interior peak 38 of the body 30 proximate to the distal end 26 of the calf rest 22. In some embodiments, the first and second troughs 32, 34 may be deepest relative to the interior peak 38 of the body 30 proximate to the proximal end 24 of the calf rest 22. In some implementations, the varying depth of the first and second troughs 32, 34 of the body 30 between the proximal and distal ends 24, 26 may be due to the curved surfaces 46 of the contoured sections 42 of the first and second troughs 32, 34 of the body 30 of the calf rest 22. For example, the contoured section 42 of the first trough 32 of the body 30 may include a first portion 56 proximate to the proximal end 24 of the calf rest 22 for receiving the calf of a seated occupant, and a second portion 58 proximate to the distal end 26 of the calf rest 22 for receiving the ankle of the seated occupant. The first portion 56 may be deeper relative to the interior peak 38 of the body 30 than the second portion 58, as the calf of the seated occupant generally extends outward from the leg L further than the ankle.

Referring now to FIGS. 1, 2, and 5-7, the calf rest 22 may include the wire 60. In various embodiments, the wire 60 may extend across the first trough 32 of the body 30 from the first exterior peak 36 to the interior peak 38. In some embodiments, the wire 60 may extend across the second trough 34 from the second exterior peak 40 to the interior peak 38. In the embodiments illustrated in FIGS. 5 and 6, the wire 60 extends across the first trough 32 from the first exterior peak 36 to the interior peak 38 and across the second trough 34 from the interior peak 38 to the second exterior peak 40. In some embodiments, the wire 60 may extend from the interior peak 38 to the first and/or second exterior peaks 36, 40 across the first and/or second troughs 32, 34 in a calf rest-lateral direction. The calf rest-lateral direction may be generally perpendicular to the direction that the calf rest 22 extends from the proximal end 24 to the distal end 26. As illustrated in FIGS. 1 and 2, in some embodiments, the calf rest 22 may include a plurality of wires 60 that extend across the first and/or second troughs 32, 34.

Figure 5:
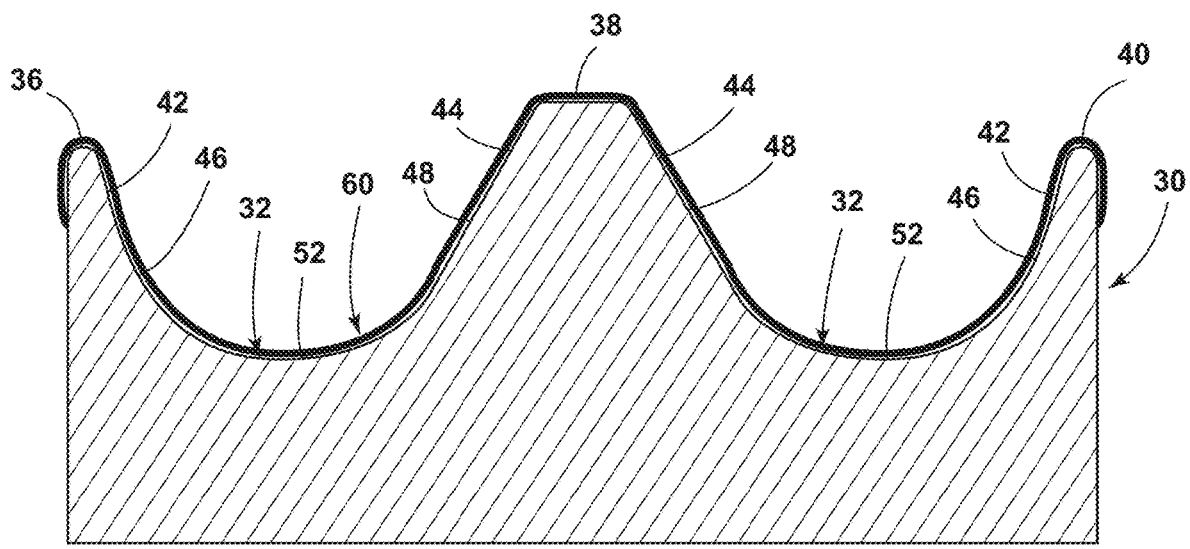
FIG. 5 is a cross-sectional view of the body of FIG. 3 taken through line IV-IV, and further illustrating a wire extending from a first exterior peak of the body to a second exterior peak of the body, wherein the wire is in the at rest condition, according to one embodiment.

The wire 60 illustrated in FIG. 5 is shown in the at rest condition, but the wire 60 may be configured to be operable between the at rest condition and a contracted condition. This is due to the wire 60 being a shape memory alloy wire that thermally actuates when exposed to an electric current. Shape memory alloy wires contract to the contracted condition when exposed to a current, and return to their original lengths in the at rest condition when the current is removed. The operability of the wire 60 of the calf rest 22 to contract may provide a massage feature for the calf rest 22, as described further herein.

Various types of wires 60 operable between at rest and contracted conditions are contemplated (e.g., nickel titanium alloy, shape memory polymer wires, etc.). The wire 60 of the calf rest 22 may be coupled to an electric current source 62, such as a battery, and a controller 64 that is configured to control the application of the current to the wire 60. It is contemplated that the controller 64 may prompt current to be provided to the wire 60 in response to one or more of a variety of inputs. For example, the controller 64 may receive an input signal from an input feature 66 (e.g., switch) of the seating assembly 14 that indicates the occupant's desire for actuation of the massage system of the calf rest 22. In response to receiving the input signal, the controller 64 may prompt current to be intermittently applied to the wire 60 to move the wire 60 between the at rest and contracted conditions repeatedly.

Figure 6:
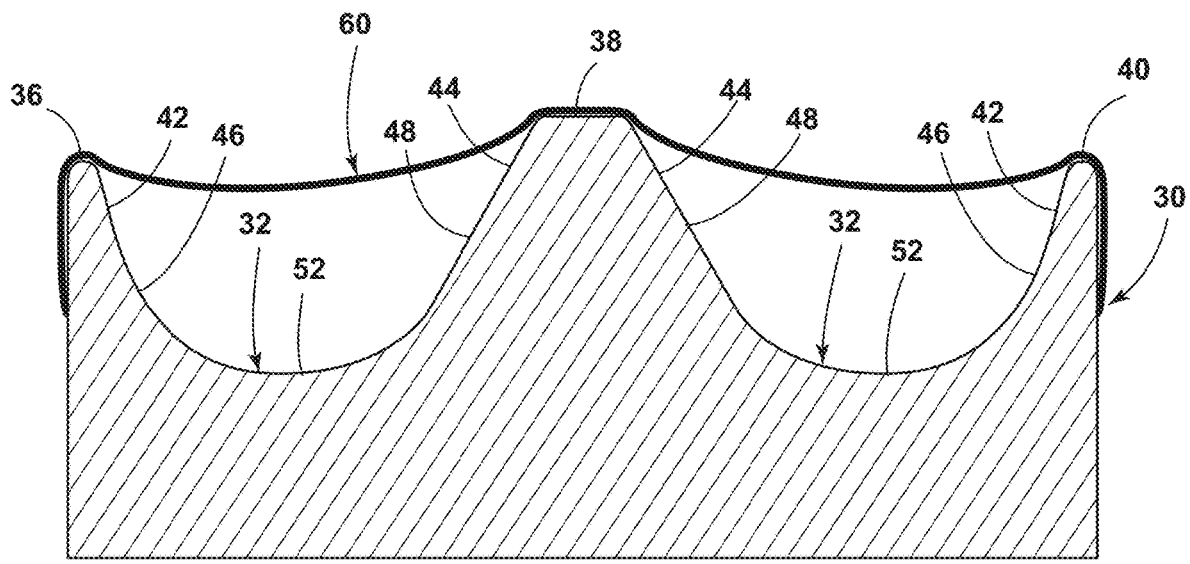
FIG. 6 is a cross-sectional view of the body of FIG. 3 taken through line IV-IV, and further illustrating the wire extending from the first exterior peak to the second exterior peak in a contracted condition, according to one embodiment.
Figure 7:
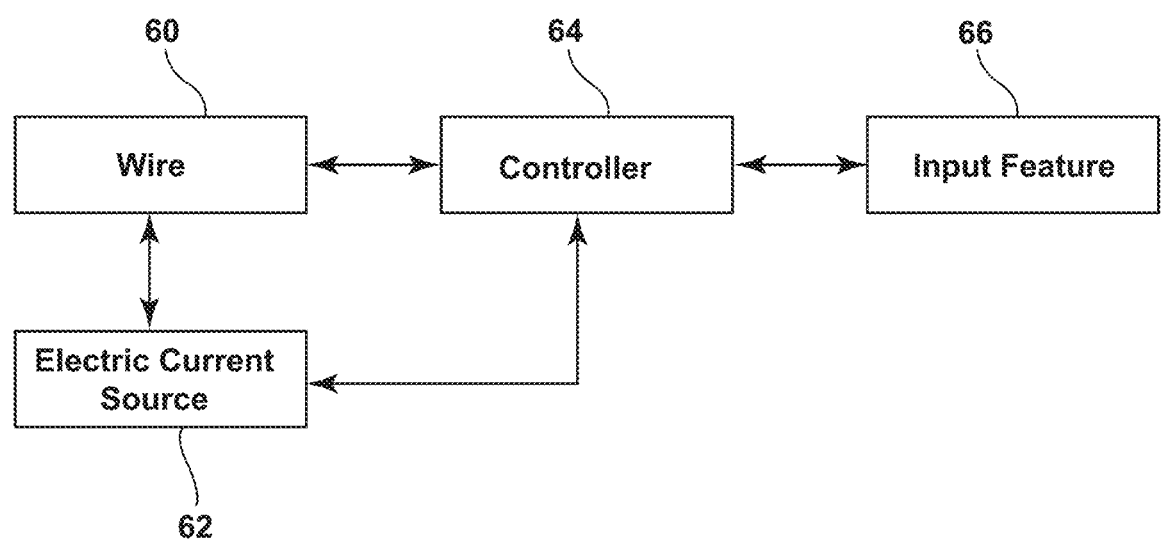
FIG. 7 is a schematic diagram, illustrating a controller coupled to the wire, according to one embodiment.

Referring now to FIGS. 5 and 6, the wire 60 may contract due to the application of current, such that the wire 60 is shorter from end to end in the contracted condition relative to the at rest condition. In some embodiments, wherein the wire 60 extends across the first trough 32 of the body 30 from the first exterior peak 36 to the interior peak 38, the wire 60 may extend along the contour of the first trough 32 between the first exterior peak 36 and the interior peak 38 while in the at rest condition. In such embodiments, the wire 60 may be suspended from the first exterior peak 36 and the interior peak 38 over the first trough 32 of the body 30 in the contracted condition. In the embodiment illustrated in FIGS. 5 and 6, wherein the wire 60 extends across the first trough 32 of the body 30 from the first exterior peak 36 to the interior peak 38 and across the second trough 34 of the body 30 from the interior peak 38 to the second exterior peak 40, the wire 60 may extend along a contour of the first trough 32 between the first exterior peak 36 and the interior peak 38 and along the contour of the second trough 34 from the interior peak 38 to the second exterior peak 40 while in the at rest condition. Further, in the contracted condition, the wire 60 may be suspended from the first exterior peak 36 and the interior peak 38 over the first trough 32 and may be suspended from the interior peak 38 and the second exterior peak 40 over the second trough 34 of the body 30. As illustrated in FIGS. 5 and 6, the shortening of the wire 60 that results from the wire 60 entering the contracted condition causes the portions of the wire 60 that extend across the first and second troughs 32, 34 to extend upward away from the first and second troughs 32, 34 of the body 30. As described further herein, this upward movement of the portions of the wire 60 extending across the first and second troughs 32, 34 may apply pressure to the lower legs L of the seated occupant.

In operation of an exemplary embodiment of the seating assembly 14, the calf rest 22 of the seating assembly 14 may initially be in the retracted position and a plurality of wires 60 extending laterally across the body 30 of the calf rest 22 may initially be in at rest conditions. The occupant of the seating assembly 14 may then move the calf rest 22 to the deployed position and actuate a calf rest massage system input feature 66 of the seating assembly 14. In response to actuation of the input feature 66, the controller 64 may prompt current to be selectively provided to each of the plurality of wires 60 of the calf rest 22. Each of the wires 60 is positioned between the expanded polypropylene foam body 30 of the calf rest 22 and the trim cover 68 of the calf rest 22 that generally encapsulates the body 30. Each of the wires 60 extends laterally across the first trough 32 of the body 30 from the first exterior peak 36 to the interior peak 38 and across the second trough 34 of the body 30 from the interior peak 38 to the second exterior peak 40. In the at rest conditions, the wires 60 extend along the contours of the first and second troughs 32, 34 between the interior peak 38 and the first and second exterior peaks 36, 40. When current is applied to the wires 60, the wires 60 shift to the contracted condition and shorten, which causes portions of the wires 60 that extend across the first and second troughs 32, 34 to be suspended between the interior peak 38 and the first and second exterior peaks 36, 40 of the body 30. As the wires 60 repeatedly move between the rest and contracted conditions, they intermittently press against the rear sides of the seated occupant's legs L to create a massaging effect.

The present disclosure may provide a variety of advantages. First, the body 30 being formed of foam with a relatively high indentation load deflection value, such as expanded polypropylene, may allow the interior peak 38 and first and second exterior peaks 36, 40 to better withstand the forces applied by the wire 60 as the wire 60 enters the contracted condition compared to low indentation load deflection value foams that are typically associated with seating assembly cushions. Second, the sloped sections 44 of the first and second troughs 32, 34 of the body 30 being generally planar and extending at laterally-inboard angles from the contoured sections 42 to the interior peak 38 may (1) enable the first and second troughs 32, 34 to comfortably accommodate legs L of various girths, and (2) cause the wire 60 to press against the rear sides of a seated passenger's legs L rather than pinching against the left and right sides of the seated occupant's legs L when moving from the at rest condition to the contracted condition.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seating assembly, comprising:
   a seat base;
   a seatback coupled to the seat base;
   a calf rest coupled to the seat base and having a body that comprises:
   a first trough that extends from a first exterior peak to an interior peak; and
   a second trough that extends from a second exterior peak to the interior peak;

a wire that extends across the first trough from the first exterior peak to the interior peak, the wire being operable between an at rest condition and a contracted condition, wherein movement of the wire from the at rest condition to the contracted condition moves a portion of the wire between the first exterior peak and the interior peak away from a bottom of the first trough; and a controller that prompts electrical current to be supplied to the wire to move the wire from the at rest condition to the contracted condition.

2. The seating assembly of claim 1, wherein the wire further extends across the second trough from the interior peak to the second exterior peak.

3. The seating assembly of claim 1, wherein a height of the interior peak relative to the bottom of the first trough is greater than a height of the first exterior peak relative to the bottom of the first trough.

4. The seating assembly of claim 1, wherein the calf rest extends from a proximal end that is proximate to the seat base to a distal end that is distal from the seat base, and wherein, relative to the interior peak, the bottom of the first trough is shallowest proximate to the distal end of the calf rest.

5. The seating assembly of claim 1, wherein the wire extends along the contour of the first trough between the first exterior peak and the interior peak in the at rest condition, and is suspended from the first exterior peak and the interior peak over the first trough in the contracted condition.

6. The seating assembly of claim 1, wherein the body is a foam body that is shaped to form the first and second troughs, the interior peak, and the first and second exterior peaks.

7. The seating assembly of claim 6, wherein the foam body is expanded polypropylene.

8. The seating assembly of claim 6, wherein the first trough of the foam body includes a contoured section having a curved surface that is between the first exterior peak and the interior peak and a sloped section having a generally planar surface that is between the contoured section and the interior peak.

9. The seating assembly of claim 8, wherein the sloped section slopes foam body-laterally-inboard away from the contoured section and toward the interior peak.

10. A seating assembly for a vehicle, comprising:
a seat base;
a seatback coupled to the seat base;
a calf rest coupled to the seat base and having a body that comprises:
a first trough that extends from a first exterior peak to an interior peak; and
a second trough that extends from a second exterior peak to the interior peak,
wherein the calf rest is operable to move relative to the seat base between a retracted position and a deployed position;
a wire that extends across the first trough from the first exterior peak to the interior peak and across the second trough from the interior peak to the second exterior peak, the wire being operable between an at rest condition, wherein the wire extends along a contour of the first trough between the first exterior peak and the interior peak and along a contour of the second trough from the interior peak to the second exterior peak, and a contracted condition, wherein the wire is suspended from the first exterior peak and the interior peak over the first trough and is suspended from the interior peak and the second exterior peak over the second trough; and
a controller that prompts electrical current to be supplied to the wire to move the wire from the at rest condition to the contracted condition.

11. The seating assembly of claim 10, wherein a height of the interior peak relative to a bottom of the first trough is greater than a height of the first exterior peak relative to the bottom of the first trough.

12. The seating assembly of claim 10, wherein the calf rest extends from a proximal end that is proximate to the seat base in the deployed position of the calf rest to a distal end that is distal from the seat base in the deployed position of the calf rest, and wherein, relative to the interior peak, the bottom of the first trough is shallowest proximate to the distal end of the calf rest.

13. The seating assembly of claim 10, wherein the body is a foam body that is shaped to form the first and second troughs, the interior peak, and the first and second exterior peaks.

14. The seating assembly of claim 13, wherein the foam body is expanded polypropylene.

15. The seating assembly of claim 13, wherein the first trough of the foam body includes a contoured section having a curved surface that is between the first exterior peak and the interior peak and a sloped section having a generally planar surface that is between the contoured section and the interior peak.

16. The seating assembly of claim 15, wherein the sloped section slopes foam body-laterally-inboard away from the contoured section and toward the interior peak.

* * * * *